United States Patent [19]

Clostermeyer

[11] Patent Number: 4,597,241
[45] Date of Patent: Jul. 1, 1986

[54] LARGE BALING PRESS FOR AGRICULTURAL PRODUCTS

[75] Inventor: Gerhard Clostermeyer, Gütersloh, Fed. Rep. of Germany

[73] Assignee: CLAAS OHG, Harsewinkel, Fed. Rep. of Germany

[21] Appl. No.: 690,975

[22] Filed: Jan. 11, 1985

[30] Foreign Application Priority Data

Jan. 17, 1984 [DE] Fed. Rep. of Germany ... 8401166[U]

[51] Int. Cl.⁴ .................. B65B 11/04; B65B 63/04
[52] U.S. Cl. ........................... 53/116; 53/587; 242/55.2; 242/75.4
[58] Field of Search .............. 53/116, 118, 593, 389, 53/587; 242/55.2, 55.53, 75.4; 56/343; 100/5

[56] References Cited

U.S. PATENT DOCUMENTS

| 2,596,428 | 5/1952 | O'Malley | 242/75.4 |
| 2,650,773 | 9/1953 | Fanning | 242/75.4 |
| 3,245,633 | 4/1966 | Madel | 242/75.4 |
| 3,510,033 | 5/1970 | Schramm | 242/55.2 |
| 4,409,784 | 10/1983 | Van Ginhoven | 100/5 |
| 4,502,621 | 3/1985 | Thatcher | 242/55.53 |

FOREIGN PATENT DOCUMENTS 117477 10/1946 Sweden .............. 242/75.4

Primary Examiner—John Sipos
Attorney, Agent, or Firm—Michael J. Striker

[57] ABSTRACT

A large baling press for agricultural products has a plurality of driven winding elements, a housing, a web roller with supply of web material to wrap finished bales, a container for receiving the web rollers so that the web roller is in contact with the container in at least two points, and a braking element for braking the web roller so that with decreasing diameter of the web roller it is pressed with increasing pressing force, wherein the braking element is formed as a braking rod abutting against the web roller, and a spring is provided for urging of the braking rod against the web roller.

4 Claims, 2 Drawing Figures

LARGE BALING PRESS FOR AGRICULTURAL PRODUCTS

BACKGROUND OF THE INVENTION

The present invention relates to a large baling press for agricultural products.

Large baling presses are known in the art. They have as a rule driven winding elements, particularly winding rollers, and a housing having lateral limiting walls. The press is provided with an arrangement for receiving a web roller which carries a web for wrapping the finished bales. During wrapping a finished bale, the web roller cooperates with a braking arrangement. It has been proposed to arrange the web roller in a container so that the outer surface of the roller during the entire rolling process is in contact with the container walls at least in two points and the braking element abuts against the web rollers so that with a decreasing diameter of the web roller an increasing pressing force is applied to the roller. It is however advisable to further improve the known construction.

SUMMARY OF THE INVENTION

Accordingly, it is an object of the present invention to provide a large baling press with a web roller and a braking element, having an improved construction as compared with the known presses.

In keeping with these objects and with others which will become apparent hereinafter, one feature of the present invention resides, briefly stated, in a large baling press having a plurality of driven winding elements, a housing, a web roll arranged in a container and provided with a braking element, wherein the braking element is formed as a braking rod which abuts against the outer surface of the web roller, and is mounted on the free ends of two spring-biased turning levers, and a free space between the turning levers is covered by a flat element.

When the large baling press is designed in accordance with the present invention, it is guaranteed that the roller of the wrapping material is always located in a fixed position and cannot be deflected, regardless of its diameter.

The novel features of the present invention which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
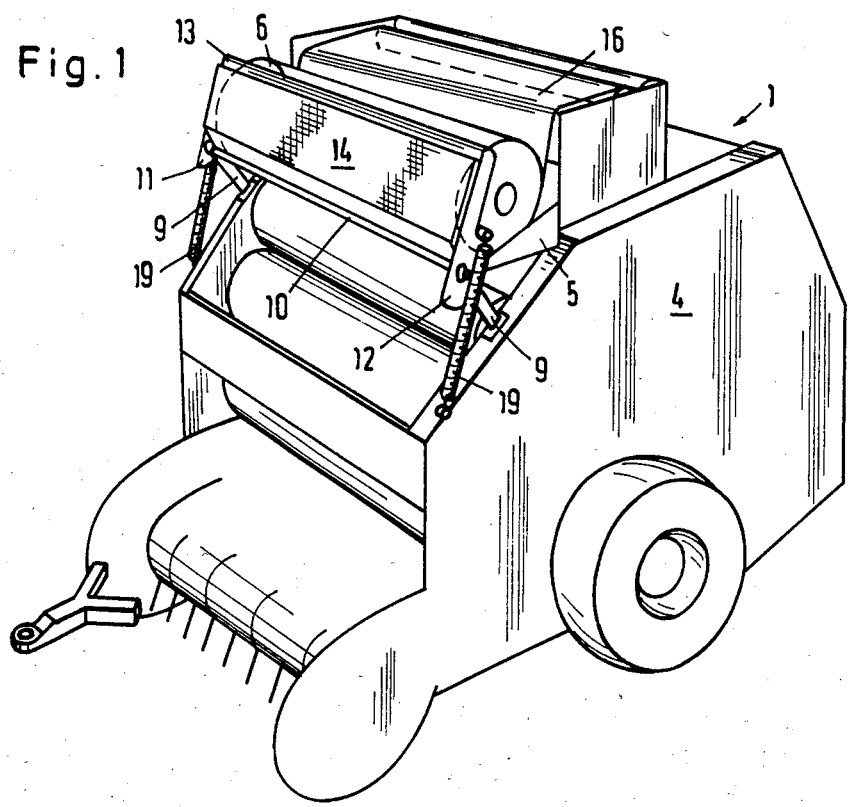
FIG. 1 is a perspective view of a large baling press in accordance with the present invention.
Figure 2:
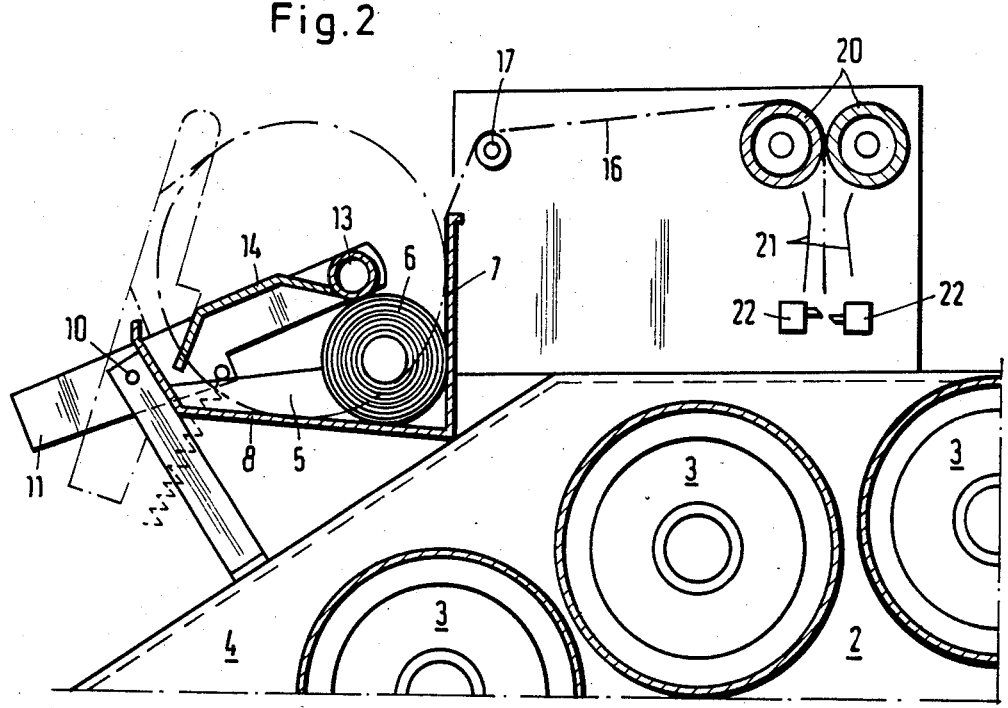
FIG. 2 is a side view of the upper part of the large baling press of FIG. 1, sectioned.

A large baling press in accordance with the present invention is identified as a whole with reference numeral 1. The baling press has a pressing chamber 2 which is limited peripherally by winding rollers 3 and laterally by walls 4.

A container 5 is arranged above the press 1 and connected with the latter. A web roller 6 is supported in the container 5 without an axle. The container 5 has a rear wall 7 and a bottom 8. The rear wall 7 and the bottom 8 of the container 5 are arranged so that an angle of less than 90° is formed between them. More particularly, the bottom 8 is inclined to a horizontal plane. In this construction the web roller is supported by the bottom 8 and by the rear wall 7. More particularly, with the reducing diameter of the web roller 6, it rolls on the inclined bottom 8 and always abuts against the rear wall 7.

As can be seen from the drawing, supporting members 9 are welded with the lateral walls 4 of the press 1. A shaft 10 is rotatably mounted on the free ends of the supporting members 9. The shaft 10 has end portions, and two turning levers 11 and 12 are connected with the end portions of the shaft 10. The turning levers 11 and 12 have end portions which are remote from the shaft 10 and carry a braking rod 13. The braking rod 13 is fixedly connected with the turning levers 11 and 12.

A free space remains between the turning levers 11 and 12. This free space is covered by a flat element formed as a sheet 14 or the like. The flat element 14 is located immediately adjacent to the braking rod 13. For increasing the pressing force of the braking rod 13, a pulling springs 19 are provided. The pulling spring 19 engages with the turning levers 11 and 12 and pull the levers toward the web roller 6 so as to pull the breaking rod 13 against the web roller 6. Therefore with decreasing diameter of the web roller 6, the braking rod 13 acts upon the web roller 6 with increased pressing force.

The large baling press also has a deviating roller 17 and pulling rollers 20. Guiding sheets 21 are associated with the deviating roller 17 and the guiding roller 20. A pair of separating cutters 22 are arranged after the guiding sheets 21. A web for wrapping of a finished bale is identified with reference numeral 16. It is supplied from the web roller 6, pulled by the deviating roller 17 by the pulling rollers 20, guided between the guiding sheets 21 and then cut in pieces by the separating cutters 22.

It will be understood that each of the elements described above, or two or more together, may also find a useful application in other types of constructions differing from the types described above.

While the invention has been illustrated and described as embodied in a large baling press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A large baling press for agricultural products, comprising a housing; a plurality of driven winding elements; a web roller arranged for carrying a web for wrapping of finished bales; a container for receiving said web roller and having at least two walls so that said web roller is supported only by said walls and is in contact with said walls in at least two points during rolling of said web roller without being supported by its axis of rotation; and means for braking said web roller including a braking rod arranged to abut against said web roller, two spring-biased spaced elongated turning levers turnably mounted on said housing at a distance from each other greater than the width of said web roller and having free ends connected by said braking rod, and a flat element mounted on said turning levers to cover the space between said turning levers, so as to connect said turning levers over a greater part of their length and also to prevent sliding of said web roller, which is supported only by said in contact with said walls during its rolling, away from said braking rod through the space between said turning levers.

2. A large baling press as defined in claim 1; and further comprising spring means arranged to urge said turning levers toward said web roller.

3. A large baling press as defined in claim 1; and further comprising two supporting members fixedly mounted on said housing and having free ends, and a shaft rotatably mounted in said free ends of said two supporting members and turnably supporting said turning levers.

4. A large baling press as defined in claim 2, wherein said spring means includes two pulling springs each engaging a respective one of said turning levers.

* * * * *